United States Patent [19]

Aruga et al.

[11] 3,997,707

[45] Dec. 14, 1976

[54] METHOD FOR SUSPENSION-POLYMERIZING VINYL CHLORIDE

[75] Inventors: Shiro Aruga; Kazuaki Nakano; Seigo Ishibashi, all of Minamata, Japan

[73] Assignee: Chisso Corporation, Osaka, Japan

[22] Filed: Apr. 25, 1975

[21] Appl. No.: 571,449

[30] Foreign Application Priority Data

Apr. 26, 1974 Japan .............................. 49-47271

[52] U.S. Cl. .................................. 526/62; 526/74; 526/172; 526/192; 526/216
[51] Int. Cl.$^2$ ..................... C08F 2/18; C08F 14/06
[58] Field of Search ................ 260/92.8 N; 526/62, 526/74, 172, 192, 216

[56] References Cited

UNITED STATES PATENTS

| 2,473,549 | 6/1949 | Smith | 260/92.8 W |
| 3,778,423 | 12/1973 | Reiter | 260/92.8 W |
| 3,849,179 | 11/1974 | Morningstar | 260/92.8 W |

*Primary Examiner*—Alan Holler
*Attorney, Agent, or Firm*—Fred Philpitt

[57] ABSTRACT

A method of suspension polymerization, which is effective to prevent the adhesion of scale-form polymer to the inside wall of polymerization vessel, is provided by adding oxalic acid or its salt to the polymerization system consisting of vinyl chloride suspended in aqueous medium.

16 Claims, No Drawings

METHOD FOR SUSPENSION-POLYMERIZING VINYL CHLORIDE

DESCRIPTION OF THE INVENTION

This invention relates to a method of suspension polymerization of vinyl chloride and the like. More particularly it relates to a method for preventing scale-form polymer (hereinafter referred to scale) from adhering to the inside wall and the like in the suspension polymerization of vinyl chloride monomer or a mixture of vinyl type monomers including vinyl chloride monomer.

When vinyl chloride monomer or a mixture of vinyl tape monomers including vinyl chloride monomer (both of which will be hereinafter referred to vinyl chloride monomer, etc.) is polymerized in a usual suspension polymerization manner, film-form polymer or polymer containing small lumps here and there, i.e. scale, adheres to the inside wall of polymerization vessel, stirrer and the like.

If polymerization reaction is carried out in the next batch without removing the scale, the amount of scale increases further and makes the heat transmission in the inside wall of polymerization vessel worse and reduces the heat removal capacity of the vessel. If scale is admixed with normal particles of polymer, a large amount of fish eyes appear in the polymer products and extremely deteriorates the quality of product. In order to prevent these harmful effects, it is necessary to get rid of the scale adhering in the polymerization reaction of the foregoing batch.

As methods for removing scale, there are employed a method in which workers use special removing tools to remove the scale, another method in which injection of high pressure water (several hundreds kg/cm$^2$) is utilized for removing and a further method which relies on washing with solvent. However, any of these removing methods includes such drawbacks that a large amount of man power, equipment costs, expenses, etc. and further long hours are necessary for cleaning time, resulting in the reduction of the operating efficiency of polymerization vessels. Even when any of the above-mentioned scale removal method is used and cleaning is carried out, the adhesion of scale formed during the time of polymerization cannot be prevented and cleaning is absolutely necessary each time in every polymerization batch.

It is, accordingly, an object of the present invention to provide a method in which no adhesion of scale-form polymer to the inside wall of polymerization vessel occurs in the suspension polymerization of the above-mentioned vinyl chloride monomer, etc. carried out in aqueous medium. It is another object of the present invention to provide a novel method for polymerizing vinyl chloride, etc. in which batchwise polymerization can be repeated without forming scale-form polymer adhering to the inside wall of polymerization vessel and hence without need of operation for removal of the above-mentioned scale.

The present invention resides in a method for polymerizing vinyl chloride monomer, etc. in an aqueous medium in suspension polymerization, in which method at least one of oxalic acid and its salts in a very small amount is added to the polymerization system or it is coated on the inside wall or stirrer blade, etc. of polymerization vessel in advance of polymerization or both procedures are applied and then polymerization is carried out.

When polymerization is to be carried out according to the method of the present invention, it is necessary to pay attention to the following items. Namely, in starting a first polymerization operation, it is necessary to clean sufficiently the inside wall of polymerization vessel by way of a well known injection of high pressure water, or a well known blowing, contacting or dissolving with an organic solvent. If washing or the like is insufficient, the effectiveness of the prevention for adhesion of scale cannot be attained.

The amount of at least one of oxalic acid and its salts to be added to the polymerization system is in the range of 0.01 ppm–10,000 ppm/monomer, preferably 0.1–5,000 ppm/monomer, most preferably 10–1,000 ppm/monomer. If it is less than 0.01 ppm, effectiveness cannot be observed almost at all and the amount greater than 10,000 ppm is not preferable because the quality of resulting polymer is deteriorated.

The amount of oxalic acid or its salts to be applied on the inside wall of polymerization vessel as coating is preferably to be not less than 0.001 g/m$^2$, most preferably to be not less than 0.01 g/m$^2$. If it is less than 0.001 g/m$^2$, the effectiveness for prevention of polymer adhesion is reduced. If oxalic acid or its salts is to be applied as coating on the wall of polymerization vessel, it would be better to apply after dissolving oxalic acid or its salts in a solvent. As a solvent, water or anything which can dissolve oxalic acid or its salts is useful and there is no limitation. As a fixing agent used for better adhesion of oxalic acid or its salts, it is possible to use simultaneously natural or synthetic high molecular weight substance or a thermosetting material.

Illustrative oxalic acid salts useful in the method of the present invention, include ammonium salt and metal salts. There can be mentioned as metals for metal salts, alkali metal such as Li, Na, K and the like; copper group elements such as Cu, Ag and the like; zinc group elements such as Zn, Cd, Hg and the like; boron group elements such as B, Al and the like; carbon group elements such as Sn, Pb and the like; titanium group elements such as Ti, Zr and the like; nitrogen group elements such as Sb, Bi and the like; vanadium group elements such as V, Ta and the like; oxygen group elements such as Se and the like; chromium group elements such as Cr and the like; manganese group elements such as Mn and the like; iron group elements such as Fe, Co, Ni and the like; light platinum group elements such as pd and the like; and heavy platinum group elements such as Pt and the like. Among oxalic acid and its salts, oxalic acid and oxalates of NH$_4$, Na, K, Cu, Mg, Ca, Ba, Al,, Sn, Mn, Fe, Co, or Ni are preferable. Particularly preferable ones are Fe, Co, Ni, Cu, Sn and Ba oxalates.

In general, a lower valency metal compound is more effective in case of polyvalent metal compound.

The above-mentioned oxalic acid salts or oxalates mean not only oxalates themselves but also mean mixtures of basic-substance-containing compounds capable forming salts with oxalic acid, and oxalic acid. The above-mentioned addition of the salts to polymerization system not only means the addition of the salts themselves but also the addition of the above-mentioned mixture of a basic-substance-containing compound and oxalic acid. For example the addition of ferrous oxalate to polymerization system means not only the addition of ferrous oxalate alone but also the addition of oxalic acid and ferrous oxalate. The above-mentioned oxalic acid or its salt may be used alone or in the form of a mixture of more than two kinds.

With regard to the time of addition of oxalic acid or a metal oxalate to polymerization system, it is preferable to add oxalic acid or the oxalate to feed water in advance of starting of reaction, but it is also possible to add after the polymerization system is heated up to a polymerization temperature. It is also possible to add midway during the polymerization time. Further, a metal oxalate can be added portionwise at various separate points.

If necessary, a pH controlling agent, a chain-transfer agent and a polymerization inhibitor can be used in the method of the present invention.

It is to be understood that addition of an inorganic substance in such an amount that is not harmful to the effectiveness of the present invention is within the scope of the present invention.

The method of the present invention can be applied to mainly a polymerization method of vinyl chloride monomer but also to a copolymerization method of a monomeric mixture containing 50% or more of vinyl chloride and a monomeric compound capable of copolymerizing with vinyl chloride. As monomeric compounds capable of copolymerizing with vinyl chloride there can be mentioned alkyl vinylesters such as vinyl acetate, alkyl vinylethers such as cetyl vinylether, $\alpha$-monoolefin monomers such as ethylene or propylene, alkyl acrylates such as ethyl acrylate, alkyl methacrylates such as methyl methacrylate.

The method of the present invention can also be applied to graft-polymerization of vinyl chloride monomer upon an ethylene-vinyl acetate copolymer or upon an ethylene propylene copolymer.

As suspension agents and initiators useful in the method of the present invention, those which are useful in a customary suspension polymerization of vinyl chloride are also useful. As suspension agents, for example, polyvinylalcohol (including partially saponified products of polyvinyl acetate), cellulose derivatives such as methyl cellulose, various synthetic high molecular weight substances such as polyvinyl pyrrolidone, copolymers of maleic anhydride-vinylacetate, natual synthetic high molecular weight substances such as starch, gelatin, tragacanth gum can be used alone or in the form of a mixture of more than one kind. As initiators, for example, organic peroxides such as lauroyl peroxide, benzoyl peroxide, tertiary-butyl peroxypivalate, diisopropyl peroxydicarbonate, dicyclohexyl peroxydicarbonate, di(3-methoxy-butyl)peroxydicarbonate, acetyl cyclohexylsulfonyl peroxide or azo-compounds such as $\alpha,\alpha'$-azobis-isobutyronitrile, $\alpha,\alpha'$-azobis-2,4-dimethyl-valeronitrile, $\alpha,\alpha'$-azobis-4-methoxy-2,4-dimethyl-valeronitrile or the like can be used alone or in the form of a mixture of more than one kind.

With regard to the time of addition of an initiator to polymerization system, it may be added to feed water in advance of starting of reaction or it may be added to the polymerization system after temperature of the system is elevated up to a polymerization temperature or it may be added during the time of polymerization or it may be added portionwise at various points of polymerization.

The effectiveness of the present invention is not injured even when a conventional additive useful together with a suspending agents is added to the polymerization system.

The polymerization reaction of the present invention is carried out with stirring, and usually at a temperature of 35°–80°C. When polymerization is carried out at such an elevated temperature it is preferable to add an initiator after the temperature of polymerization system is elevated up to an aimed polymerization temperature. Thus the notable effectiveness for preventing scale adhesion which is the object of the present invention can be attained.

In the specification of West German laid open application No. 2,248,607, there is proposed the addition of small amount of a reducing substance in the polymerization of vinyl chloride in order to prevent adhesion of scale to the inside wall of polymerization vessel. As illustrative reducing agents there are mentioned oxygen-containing acids of sulfur, phosphorus or nitrogen (sodium thiosulfate is illustrated in example), urea, hydroxylamine, formic acid and the like. However, there is described that only the addition of a reducing agent is not sufficient but effectiveness can be attained by the combination of it with a specified surface property of a reaction vessel as well as a specified flow rate on the inside wall of the reaction vessel (see page 3, lines 9–13 of the specification). In reality, we have confirmed that the above-mentioned illustrative compounds do not show sufficient effectiveness for the prevention of scale adhesion as shown in Comparative Examples 2–5 hereinafter described. Whereas oxalic acid or its salts are not explicitly disclosed in the above-mentioned specification, but they exhibit a remarkably excellent effectiveness compared with the above-mentioned concrete compounds illustrated in said specification, as shown in the following Examples and Comparative Examples 2–5. Such effectiveness cannot be anticipated at all from the disclosure of said specification.

Examples will be presented hereinafter but it is not intended to restrict the present invention.

All the heat stabilities described in the following Examples were determined according to the following heat stability test, using a resin product obtained in the first batch:

100 parts of resin, 50 parts of DOP, 2 parts of stabilizer of epoxy type, 0.5 part of calcium stearate and one part of zinc stearate were blended and kneaded at 150°C for 10 minutes and shaped into sheet. The resulting sheet was heated in a heat aging tester at 170°C till it blackened. Heat stability is expressed by the time (minute) which lapsed till blackening.

EXAMPLES 1–15

Into a 200 l capacity stainless steel polymerization vessel were fed 100 kg of pure water, 50 g of partially saponified polyvinyl acetate, metal salts of oxalic acid shown in Table 1, 40 g of lauroyl peroxide and 50 kg of vinyl chloride monomer. The contents were heated with stirring. Polymerization was continued at a polymerization temperature of 58°C for 14 hours. Thereafter, remaining monomer was driven off and the resulting polymer was taken out.

Polymerization yield and state of scale adhered are shown in Table 1.

COMPARATIVE EXAMPLES 1–5

Polymerizations were carried out under the same conditions as those of Examples 1–15 except that no metal salts of oxalic acid were added or reducing substances shown in Table 2 were added.

Polymerization yield and state of scale adhered are shown in Table 2.

As apparent from Examples 1–15 and Comparative Examples 1–5, polymerization carried out in the presence of metal salts of oxalic acid added to polymerization system, results in a remarkable effectiveness for preventing scale adhesion.

Table 1

| Example No. | 1 | 2 | 3 | 4 | 5 | 6 | 7 | 8 |
|---|---|---|---|---|---|---|---|---|
| Kind of Additive | Ca Oxalate | Al Oxalate | Zn Oxalate | Mg Oxalate | Ferrous Oxalate | Co(II) Oxalate | Ni(II) Oxalate | Cupric Oxalate |
| Amount of additive (to monomer) (ppm) | 200 | 200 | 200 | 200 | 200 | 200 | 200 | 200 |
| Polymerization yield (%) | 88–90 | 87–90 | 88–91 | 87–88 | 87–91 | 87–91 | 87–91 | 87–91 |
| Amount of scale adhered, in a first batch (g) | 0 | 0 | 0 | 0 | 0 | 0 | 0 | 0 |
| Repetition number of batches till scale is adhered | 2 | 3 | 3 | 2 | 5 | 4 | 3 | 3 |
| Heat stability (min) | 56 | 58 | 57 | 56 | 55 | 56 | 56 | 54 |

| Example No. | 9 | 10 | 11 | 12 | 13 | 14 | 15 |
|---|---|---|---|---|---|---|---|
| Kind of Additive | Stannous Oxalate | Ferrous Chloride / Oxalic Acid | Stannous Chloride / Oxalic Acid | Na Oxalate | K Oxalate | Ammonium Oxalate | Oxalic Acid |
| Amount of additive (to monomer) (ppm) | 200 | 175 / 125 | 183 / 87 | 200 | 200 | 200 | 200 |
| Polymerization yield (%) | 87–91 | 87–91 | 87–91 | 87–91 | 87–91 | 87–90 | 88–90 |
| Amount of scale adhered, in a first batch (g) | 0 | 0 | 0 | 0 | 0 | 0 | 0 |
| Repetition number of batches till scale is adhered | 5 | 4 | 5 | 2 | 2 | 2 | 2 |
| Heat stability (min) | 57 | 53 | 57 | 57 | 56 | 56 | 57 |

Table 2

| Comparative Example No. | 1 | 2 | 3 | 4 | 5 |
|---|---|---|---|---|---|
| Additive | — | Sodium thiosulfate / Sodium hydrogen carbonate | Urea | Hydroxylamine | Formic Acid |
| Amount of additive (to monomer) (ppm) | 0 | 300 / 300 | 200 | 200 | 200 |
| Polymerization yield (%) | 89 | 90 | 88–91 | 86–90 | 87–90 |
| Amount of scale adhered, in a first batch (g) | 290 | 190 | 250 | 240 | 230 |
| Repetition number of batches till scale is adhered | 0 | 0 | 0 | 0 | 0 |
| Heat stability (min) | 57 | 53 | 56 | 55 | 56 |

EXAMPLE 16–21

Into a 200 l capacity stainless steel polymerization vessel were fed 100 kg of pure water, 50 g of partially saponified polyvinylacetate, ferrous oxalate in amounts shown in Table 3, 40 g of lauroyl peroxide and 50 kg of vinyl chloride monomer. The contents were heated with stirring. Polymerization was carried out at 58°C for 14 hours. Thereafter, remaining monomer was driven off and the resulting polymer was taken out. Polymerization yield and state of scale adhesion are shown in Table 3.

Table 3

| | Example | | | | | |
|---|---|---|---|---|---|---|
| | 16 | 17 | 18 | 19 | 20 | 21 |
| Amount of ferrous oxalate added (to monomer) (ppm) | 0.1 | 50 | 200 | 500 | 1,000 | 5,000 |

Table 3-continued

| | Example | | | | | |
|---|---|---|---|---|---|---|
| | 16 | 17 | 18 | 19 | 20 | 21 |
| tion yield (g) | 88 | 86–90 | 87–91 | 86–91 | 85–88 | 86–89 |
| Amount of scale adhered, in a first batch (g) | 10 | 0 | 0 | 0 | 0 | 0 |
| Repetition number of batches till scale is adhered | 0 | 4 | 5 | 5 | 6 | 6 |
| Heat stability (min) | 56 | 58 | 57 | 54 | 53 | 49 |

EXAMPLES 22–28

Into a 200 l capacity stainless steel polymerization vessel were fed 100 kg of pure water, 50 g of partially saponified polyvinyl acetate, 50 g of ferrous oxalate, polymerization initiators shown in Table 3 and 50 kg of vinyl chloride monomer. The contents were heated with stirring. Polymerization was continued at 58°C for polymerization times shown in Table 4. Therafter, remaining monomer was driven off and the resulting polymer was taken out. Polymerization yield and state of scale adhesion are shown in Table 4.

COMPARATIVE EXAMPLES 6–12

Polymerization was carried out as in Examples 22–28 except that no ferrous oxalate was added and polymerization initiators shown in Table 5 were used. Polymerization times and state of scale adhesion are shown in Table 5.

The symbols of the polymerization initiators described in Tables 4 and 5 express the following compounds:

IPP : Diisopropylperoxydicarbonate
MBPP: Di(3-methoxybutyl)peroxydicarbonate
TBPP: Tertiary-butylperoxypivalate
ABIN: $\alpha,\alpha'$-azobisbutyronitrile
AMVN: $\alpha\alpha'$-azobis-2,4-dimethylvaleronitrile
MMVN: $\alpha,\alpha'$-azobis-4-methoxy-2,4-dimethylvaleronitrile As apparent from the above Examples 22–28 and Comparative Examples 6–12, the method of the present invention yields a remarkable effectiveness for preventing scale adhesion, by employing polymerization initiators which are customarily used by persons skilled in the art, and is not restricted at all by the kinds of polymerization initiators.

Table 4

| | Example | | | | | | |
|---|---|---|---|---|---|---|---|
| | 22 | 23 | 24 | 25 | 26 | 27 | 28 |
| Kind of initiator | IPP | MBPP | TBPP | ABIN | AMVN | (AMVN / MMVN) | (IPP / MMVN) |
| Amount of initiator (based on monomer) (ppm) | 150 | 220 | 300 | 280 | 200 | (200 / 200) | (100 / 200) |
| Polymerization time (hr) | 10 | 10 | 15 | 14 | 10 | 8 | 8 |
| Polymerization yield (%) | 86–90 | 85–89 | 87–92 | 86–90 | 86–92 | 85–91 | 86–90 |
| Repetition number of batches till scale is adhered | 5 | 4 | 5 | 5 | 5 | 5 | 5 |
| Heat stability (min) | 57 | 60 | 58 | 52 | 55 | 56 | 56 |

Table 5

| | Comparative Example | | | | | | |
|---|---|---|---|---|---|---|---|
| | 6 | 7 | 8 | 9 | 10 | 11 | 12 |
| Kind of initiator | IPP | MBPP | TBPP | ABIN | AMVN | (AMVN / MMVN) | (IPP / MMVN) |
| Amount of initiator (based on monomer) (ppm) | 150 | 220 | 300 | 280 | 200 | (200 / 200) | (100 / 200) |
| Polymerization time (hr) | 10 | 10 | 15 | 14 | 10 | 8 | 8 |
| Polymerization yield (%) | 87 | 88 | 88 | 89 | 91 | 90 | 89 |
| Amount of scale adhered, in a first batch (g) | 160 | 210 | 180 | 310 | 250 | 270 | 210 |
| Heat | | | | | | | |

Table 5-continued

| | Comparative Example | | | | | | |
|---|---|---|---|---|---|---|---|
| | 6 | 7 | 8 | 9 | 10 | 11 | 12 |
| stability (min) | 56 | 61 | 58 | 53 | 55 | 57 | 58 |

EXAMPLE 29

A 200 l capacity stainless steel polymerization vessel was heated to 90°C, and an aqueous solution of oxalic acid was uniformly coated onto the inner wall of the vessel, the shaft and vanes of stirrer and the buffles within the vessel, at a rate of about 1 g/m², using a spray gun, followed by drying at 90°C for 30 minutes. After drying, 100 kg of pure water, 50 g of partially saponified polyvinyl acetate, 40 g of lauroyl peroxide and 50 kg of vinyl chloride monomer were fed into the vessel. The contents were heated with stirring. Polymerization was continued at 58°C for 14 hours. Thereafter, remaining monomer was driven off and the resulting polymer was taken out. The resulting polymerization yield was 89%. No scale was adhered. Thus, polymerization was repeated. After polymerizations in two batches, scale adhered. The amount adhered was about 5 g.

EXAMPLE 30

Polymerization was carried out as in Example 29 except that 25 g of oxalic acid was added to the polymerization system. Polymerization yield was 90%. Since no scale adhered, polymerization was repeated by the addition of 25 g of oxalic acid in each batch. After the polymerization in the fourth batch, scale adhered. The adhered amount was about 5 g.

EXAMPLE 31

Into a 200 l capacity stainless steel polymerization vessel were fed 100 kg of pure water, 75 g of partially saponified polyvinyl acetate, 30 g of lauroyl peroxide, 5 g of ferrous oxalate, 45 kg of vinyl chloride monomer and 5 kg of vinyl acetate monomer. The contents were heated with stirring. Polymerization was continued at 63°C for 12 hours. Thereafter, remaining monomers were driven off and the resulting polymer was taken out. Polymerization yield was 86% and no scale adhesion was observed. Since no scale was adhered, the same polymerization was repeated. Polymerization in three batches could be carried out till scale adhered.

COMPARATIVE EXAMPLE 13

Polymerization was carried out as in Example 31 except that no ferrous oxalate was added to the polymerization system. Polymerization yield was 85%. The amount of scale adhered was 410g.

As apparent from the above Example 31 and Comparative Example 13, according to the method of the present invention, the effectiveness of preventing scale adhesion can be observed also in the case of copolymerization of vinyl chloride monomer with another vinyl monomer such as vinyl acetate, as in the case of polymerization of vinyl chloride monomer alone.

EXAMPLE 32

Into a 200 l capacity stainless steel polymerization vessel were fed 100 kg of pure water, 200 g of partially saponified polyvinylacetate, 5 g of ferrous oxalate, 37 kg of vinyl chloride and 13 kg of ethylene-vinyl acetate copolymer. After stirring was carried out at room temperature for 5 hours, 7 g of $\alpha,\alpha'$-azobis-2,4-dimethylvaleronitrile was added, followed by heating. Polymerization was continued at 60° C for 7 hours. Thereafter, remaining monomer was driven off and resulting polymer was taken out. Polymerization yield was 88%.

Since no scale adhered, polymerization was repeated according to the above-mentioned polymerization method till scale adhesion was observed. As a result, polymerization in seven batches could be carried out.

COMPARATIVE EXAMPLE 14

Polymerization was carried out as in Example 20 except that no ferrous oxalate was added to the polymerization system. Polymerization yield was 88%. The amount of scale adhered was 200 g.

As apparent from the above Example 32 and Comparative Example 14, according to the method of the present invention, the effectiveness of preventing scale adhesion was observed also in the case of graft-polymerization of vinyl chloride monomer to ethylene-vinyl acetate copolymer.

EXAMPLE 33-38

Into a 200 l capacity stainless steel polymerization vessel were fed 100 kg of pure water, 50 g of partially saponified polyvinyl acetate, additives shown in Table 6 and 50 kg of vinyl chloride monomer. Temperature was elevated with stirring. When temperature reached 58° C, 10 g of $\alpha,\alpha'$-azobis-2,4-dimethylvaleronitrile was added. Polymerization was continued at 58° C for 10 hours. Thereafter, remaining monomer was driven off and the resulting polymer was taken out. Polymerization yield and state of scale adhesion are shown in Table 6.

As apparent from the comparison of this Example with Examples 1–15, when oxalic acid or its salt is added to the polymerization system, and after elevating the temperature of the polymerization system to polymerization temperature, a polymerization initiator is added to the polymerization system, the effectiveness of preventing scale adhesion is remarkably improved.

Table 6

| Example No. | 33 | 34 | 35 | 36 | 37 | 38 |
|---|---|---|---|---|---|---|
| Additive | Calcium oxalate | Ferrous oxalate | Cobaltous oxalate | Ni(II) oxalate | Cupric oxalate | Stannous oxalate |
| Amount of additive (to monomer) (ppm) | 100 | 100 | 100 | 100 | 100 | 100 |

Table 6-continued

| | | | | | | |
|---|---|---|---|---|---|---|
| Polymerization yield (%) | 87–91 | 87–91 | 87–91 | 87–91 | 87–91 | 87–91 |
| Amount of scale adhered, in the first batch (g) | 0 | 0 | 0 | 0 | 0 | 0 |
| Repetition number of batches till scale adhered | 18 | 22 | 20 | 20 | 19 | 23 |
| Heat stability | 57 | 54 | 55 | 56 | 54 | 57 |

What is claimed is:

1. In the suspension-polymerization of vinyl chloride monomer or a mixture thereof with another kind of vinyl monomer in an aqueous medium, in the presence of a suspension agent and an oil soluble polymerization initiator, the improvement which comprises carrying out the suspension polymerization in a polymerization vessel in the presence of at least one member selected from the group consisting of oxalic acid and its inorganic salts, said member being present in an amount effective to prevent the adhesion of scale form polymer to the inside wall of the polymerization vessel.

2. A method according to claim 1 wherein said member is added to the contents of the polymerization vessel in an amount beetweem 0.1 ppm to 10,000 ppm based on the weight of said monomer or mixture of monomers.

3. A method according to claim 1 wherein said member is applied to the interior surface of the polymerization vessel in advance of the suspension polymerization in an amount not less than 0.001 g/m² of vessel surface.

4. A method according to claim 1 wherein said member is applied to the interior surface of the polymerization vessel in an amount not less than 0.001 g/m² of vessel surface and also added to the contents of the polymerization vessel in an amount between 0.01 ppm and 10,000 ppm based on the weight of said monomer or mixture of monomers.

5. A method according to claim 1 wherein said member is oxalic acid.

6. A method according to claim 1 wherein said member is ammonium oxalate.

7. A method according to claim 1 wherein said member is a metal salt of oxalic acid.

8. A method according to claim 1 wherein said member is at least one oxalate of metal selected from the group consisting of Na, K, Cu, Mg, Ca, Ba, Al, Sn, Mn, Fe, Co, and Ni.

9. A method according to claim 1 wherein said member is at least one oxalate of a metal selected from the group consisting of Cu, Ba, Sn, Fe, Co and Ni.

10. A method according to claim 2 wherein said member is oxalic acid.

11. A method according to claim 2 wherein said member is ammonium oxalate.

12. A method according to claim 2 wherein said member is a metal salt of oxalic acid.

13. A method according to claim 2 wherein said member is at least one oxalate of metal selected from the group consisting of Na, K, Cu, Mg, Ca, Ba, Al, Sn, Mn, Fe, Co and Ni.

14. A method according to claim 2 wherein said member is at least one oxalate of a metal selected from the group consisting of Cu, Ba, Sn, Fe, Co and Ni.

15. A method according to claim 2 wherein said suspension-polymerization is carried out at a higher temperature than room temperature and a polymerization initiator is added after the temperature of said polymerization mixture is elevated to the polymerization temperature thereof.

16. A method according to claim 2 wherein said suspension-polymerization is carried out at a higher temperature than room temperature; a polymerization initiator is added after the temperature of said polymerization mixture is elevated to the polymerization temperature thereof; and said member is a metal salt of oxalic acid.

* * * * *